Nov. 17, 1931. O. L. PEARD ET AL 1,832,578
ELECTRIC HEATER FOR USE WITH AUTOMOBILES
Filed Dec. 23, 1929  2 Sheets-Sheet 1
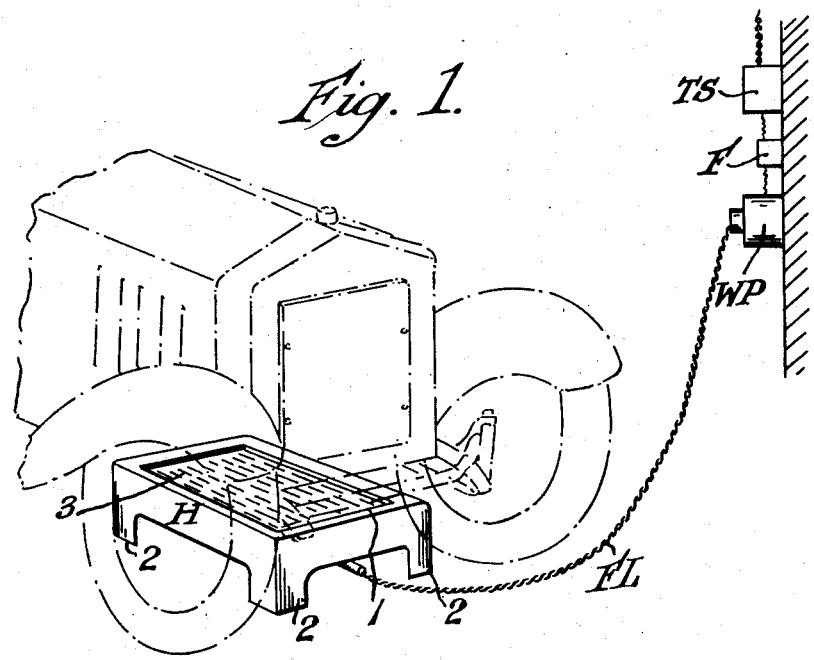
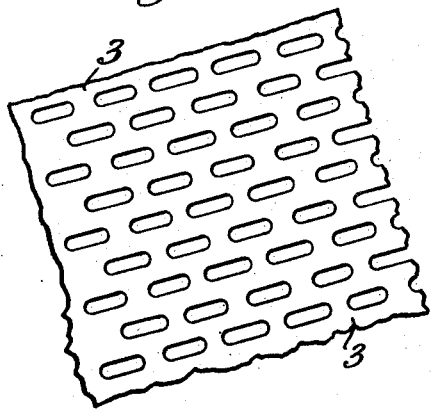
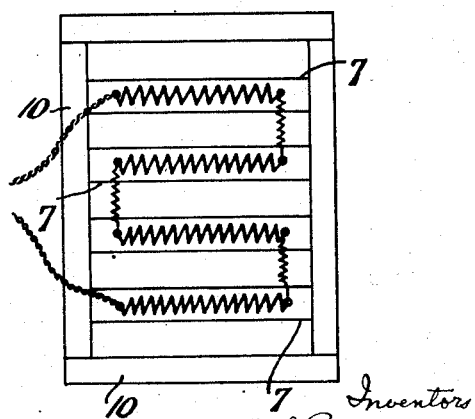

Nov. 17, 1931. O. L. PEARD ET AL 1,832,578
ELECTRIC HEATER FOR USE WITH AUTOMOBILES
Filed Dec. 23, 1929   2 Sheets-Sheet 2
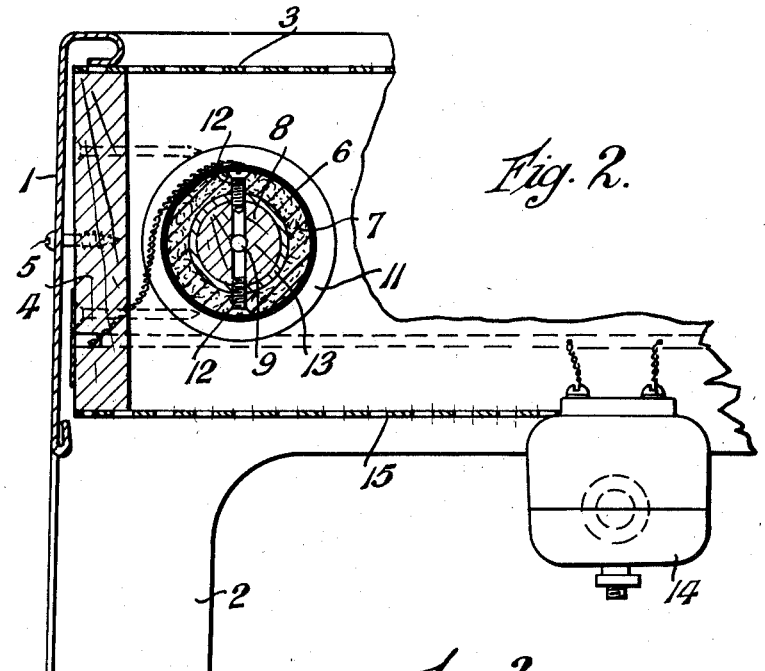
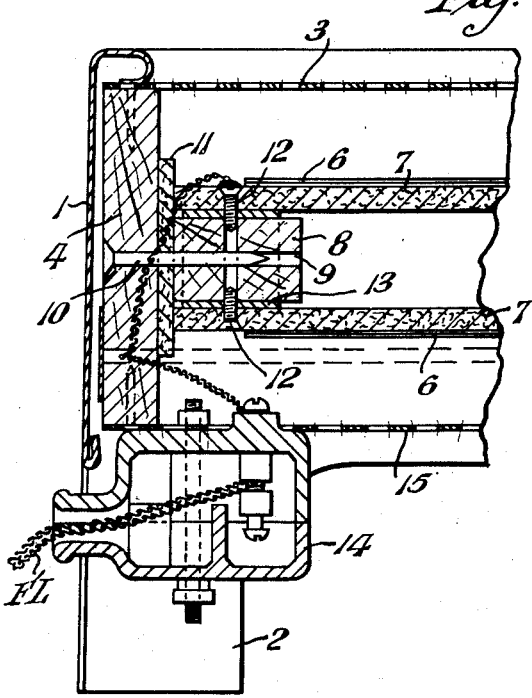

Patented Nov. 17, 1931

1,832,578

UNITED STATES PATENT OFFICE

OLIVER LEOPOLD PEARD AND STANLEY McCLOUD PEARD, OF CROYDON, AND ALFRED FRANK HARRISON, OF EPSOM, ENGLAND

ELECTRIC HEATER FOR USE WITH AUTOMOBILES   REISSUED

Application filed December 23, 1929. Serial No. 416,168.   MAY 3 1932

This invention relates to an improved electric heater for use with automobiles.

It is well known that with extreme temperatures, the water in the cooling system of an automobile is liable to freeze and the consequent expansion may cause very considerable damage by cracking the cylinders or other parts of the internal combustion engine. Apart from the question of possible damage, there is also the disadvantage that in very cold weather automobiles may become difficult to start. It is well known to endeavour to avoid these disadvantages by providing so-called safety oil burning heaters of one kind or another in close proximity to the engine or radiator of an automobile. Said heaters, however, all suffer from more or less serious disadvantages. The heaters, which are in most common use, are those in which the heat is obtained from the burning of oil fuel, such as paraffin, and in such heaters the serious disadvantage occurs, that it obviously is undesirable to place a flame, even if enclosed in a protecting gauze, in close proximity to an automobile engine, owing to the danger of fire. Furthermore, such heaters are messy to fill and use.

It is a primary object of the present invention to provide a heater which may be placed in perfect safety in close proximity to the engine or radiator of an automobile.

A further object is to provide a heater which is clean and simple to use and of robust and sturdy construction.

Another object is to provide a heater which will automatically maintain the engine of an automobile at or about the desired minimum temperature.

These and other objects are attained by employing for the purpose specified an electric heater comprising resistance windings of low specific resistance of such design that the heat necessary to maintain the automobile engine above a predetermined minimum temperature, is emitted at a comparatively low temperature well below the ignition point of petrol, the necessary heat transference being obtained by convection of air. Preferably, the circuit for the electric heater, includes a thermostat adapted to switch in the heater when the temperature of the surrounding air falls below the predetermined minimum allowable temperature, and to switch said heater out of circuit when the temperature rises above said predetermined minimum temperature.

The invention will be better understood with reference to the accompanying drawings which show by way of example one form of the construction in accordance with the said invention.

In these drawings, Figure 1 is a perspective view showing a heater lay-out in accordance with the invention, said lay-out comprising the heater proper, a wall plug, a fuse and a thermostatic switch, the whole being supplied from suitable mains. Figure 2 is a detail view showing in end section, one resistance coil arranged in a heater. Figure 3 is a section taken at right angles to Figure 2, and Figure 4 is a detail showing a preferred form of stamped perforated grid employed as top and bottom of the heater. Figure 5 is a schematic and diagrammatic view showing the electrical connections of a heater consisting of four resistance windings.

Upon reference to the drawings, it will be seen that the heater lay-out comprises the heater proper H energized through the usual flexible lead FL from a wall plug WP. In circuit with the wall plug, is a fuse box F and a thermostatic switch TS of any known pattern. This switch forms per se no part of this invention, and as the construction thereof will be known to those skilled in the art, it is not thought necessary to describe it here. The thermostatic switch is preferably arranged to operate within limits of about 5–10° F. on and off, i. e. to close the current supply circuit of the heater (or of a number of heaters in the same circuit) when the temperature falls below 40° F. (say), and to open said circuit, when it rises above 45° F. (say). The outward appearance of the heater will be seen from Figure 1, said heater comprising a stamped or otherwise suitably formed metal pedestal-like frame 1, standing upon corner legs 2, and covered as to its top surface with a stamped perforated grill 3. Mounted within the member 1 is a sub-frame 4—4 made of stout material which is a good thermal and electric insulator e. g. enamelled oak wood about ½" thick which is held to the member 1 in any suitable way, for example, by means of screws, such as 5. The windings are of enamelled copper wire or aluminium or other low specific resistance material, and are wound over a double layer 6 of asbestos paper which is wrapped round a tube 7 preferably of hardrolled asbestos or other strong heat resisting material. These tubes, of which there may be any desired number depending upon the total wattage of the heater are held in place by hard wood plugs 8 pushed into the end of the tube and formed each with a centrol hole 9 for receiving a nail 10 driven into and through the sub-frame. 11 is a fibre washer constituting a conveniently insulating and resilient distance piece between the tube and the sub-frame. Connections from the copper wire (suitably bared of enamel) are taken to screws, such as 12, threaded into a brass ring 13 positioned in the small space left between the hard wood plug 8 and the tube 7. Leads are taken from screws 12 to a terminal box 14 carried by the sub-frame, and conveniently positioned, for example, in the space between two corner legs of the whole device. As above stated the number of resistance wound heating tubes depends upon the wattage and also of course upon the voltage of the heater. For example, a 100 watt heater, for use with a 205 volt supply, may comprise three coils which are connected in series and are wound each upon a tube approximately 10¼" long, the winding length of each tube being just under 9" there being about 140 turns per inch of enamelled copper wire of No. 38 S. W. G. The total resistance of the tubes is of the order of 330 ohms at 60° F. For 180 watt heater, it would be convenient to employ four coils, and for a 260 watt heater, 5 coils  These winding details are given by way of example only, and will, of course, vary in accordance with the design requirements In the examples given, however, the wattage per unit area of heating winding exposed to air is sufficiently low to give an output temperature in normal circumstances of below 150° F. In order to prevent damage to the inside of the heater and to permit free flow of air, a grille 15, similar to that employed on the top of the heater, is fitted underneath, the terminal box being preferably mounted on this grille, as shown.

Overall dimensions of a heater such as described would be of the order of 13" x 6" x 5" high, the dimensions between the bottom of a leg and the top of the curved portion of the main frame between adjacent legs being about 2", i. e. the depth of the main frame between legs would be about 3".

In operation, air is drawn in from the grille beneath the heater winding, and is heated by direct contact with the windings and is then convected through the upper grille. A convenient way of utilizing the heater is to merely push the heater underneath the engine hood, so that the hot air rises from the heater and is more or less trapped under the said hood, thus maintaining the engine and radiator at not less than a desired minimum temperature.

It will be understood that the constructional details given in this specification are only by way of example, and to enable the invention readily to be carried into effect. They are not intended to be limiting in any way, since the said invention is obviously capable of wide modification in design, without departing from the spirit thereof.

Heaters according to this invention give an air temperature rise from ingoing to outcoming air of about 70° F. i. e. at a general temperature of 60° F. the emitted air is of the order of 130° F.—a temperature which is well below the ignition temperature of motor fuel.

Heaters in accordance with this invention may conveniently be designed to deliver from, say, 300 to 1,000 cubic feet per hour, according to size under the usual conditions of usage when surrounding air is near freezing point, the temperature of the copper coils is below 160° F. and air is discharged from the convector at a temperature under 120° F. and at a velocity of less than ¾th. feet per second. A large volume of slowly moving air at low temperature is thus furnished and is best adapted for the purpose of safely warming the automobile power system.

What we claim is:—

1. An electric air warming apparatus for producing a large volume of slowly moving air at comparatively low temperature for maintaining warm the cooling system and other engine parts of the internal combustion engine of an automobile and adapted for use below the engine of an automobile, comprising in combination a shallow rectangular metal chamber having feet and having its upper and lower faces covered by grille plates having narrow slotted holes of larger area to pass a large vertical air stream, an inner framework of nonconducting heat insulating material supported within said metal case and separating said case from the heating elements proper and supporting the ends of said heating elements, and a plurality of heating elements supported within said insulating framework, said elements having airways therebetween and being constructed of closely wound low resistance material wound on long narrow heat resisting tubes, the resistance values of said elements relative to their energy consumption and heating area being so chosen that maximum temperature reached in working is only of the order of 180° F.

2. An electric air warming apparatus for producing a large volume of slowly moving air at comparatively low temperature for maintaining warm the cooling system and other engine parts of the internal combustion engine of an automobile and adapted for use below the engine of an automobile, comprising in combination a shallow rectangular metal chamber having feet and having its upper and lower faces covered by grille plates having narrow slotted holes of large area to pass a large vertical airstream, an inner frame work of wood supported within said metal case and separating said case from the heating elements proper and supporting the ends of said heating elements, and a plurality of heating elements supported within said wooden frame work, said elements having airways therebetween and being constructed of closely wound low resistance material wound on long narrow heat resisting tubes, the resistance values of said elements relative to their energy consumption and heating area being so chosen that maximum temperature reached in working is only of the order of 180° F.

3. An electric air warming apparatus for producing a large volume of slowly moving air at comparatively low temperature for maintaining warm the cooling system and other engine parts of the internal combustion engine of an automobile and adapted for use below the engine of an automobile, comprising in combination a shallow rectangular metal chamber having feet and having its upper and lower faces covered by grille plates having narrow slotted holes of large area to pass a large vertical air stream, an inner framework of nonconducting heat insulating material supported within said metal case and separating said case from the heating elements proper and supporting the ends of said heating elements, and a plurality of heating elements supported within said insulating framework in a row of a single tier, said elements having airways therebetween and being constructed of closely wound low resistance material wound on long narrow heat resisting tubes, the resistance values of said elements relative to their energy consumption and heating area being so chosen that maximum temperature reached in working is only of the order of 180° F.

4. An electric air warming apparatus for producing a large volume of slowly moving air at comparatively low temperature for maintaining warm the cooling system and other engine parts of the internal combustion engine of an automobile and adapted for use below the engine of an automobile, comprising in combination a shallow rectangular metal chamber having feet and having its upper and lower faces covered by grille plates having narrow slotted holes of large area to pass a large vertical air stream, an inner framework of nonconducting heat insulating material supported within said metal case and separating said case from the heating elements proper and supporting the ends of said heating elements, and a plurality of heating elements supported within said insulating framework in a row of a single tier, said elements having airways therebetween and being constructed of closely wound enamelled copper wire wound on asbestos paper wrapped around long and narrow heat resisting tubes, the resistance values of said elements relative to their energy consumption and heating area being so chosen that maximum temperature reached in working is only of the order of 180° F.

5. An electric air warming apparatus for producing a large volume of slowly moving air at comparatively low temperature for maintaining warm the cooling system and other engine parts of the internal combustion engine of an automobile and adapted for use below the engine of an automobile, comprising in combination a shallow rectangular metal chamber having feet and having its upper and lower faces covered by grille plates having narrow slotted holes of large area to pass a large vertical air stream, an inner framework of nonconducting heat insulating material supported within said metal case and separating said case from the heating elements proper and supporting the ends of said heating elements, a plurality of heating elements supported within said insulating framework, said elements having airways therebetween and being constructed of closely wound low resistance material wound on long narrow heat resisting tubes, the resistance values of said elements relative to their energy consumption and heating area being so chosen that maximum temperature reached in working is only of the order of 180° F., a circuit extending from a source of electrical supply through said heating elements, and a thermostatic switch regulator in said circuit.

6. An electric air warming apparatus for producing a large volume of slowly moving air at comparatively low temperature for maintaining warm the cooling system and other engine parts of the internal combustion engine of an automobile and adapted for use below the engine of an automobile, comprising in combination a shallow rectangular metal chamber having feet and having its upper and lower faces covered by grille plates having narrow slotted holes of large area to pass a large vertical air stream, an inner framework of nonconducting heat insulating material supported within said metal case and separating said case from the heating elements proper and supporting the ends of said heating elements, a plurality of heating elements supported within said insulating framework in a row of a single tier, said elements having airways therebetween and being constructed of closely wound enamelled copper wire wound on asbestos paper wrapped around long and narrow heat resisting tubes, the resistance values of said elements relative to their energy consumption and heating area being so chosen that maximum temperature reached in working is only of the order of 180° F., a circuit extending from a source of electrical supply through said heating elements, and a thermostatic switch regulator in said circuit.

7. An electric low temperature convector for warming the cooling system and other parts of internal combustion engines comprising in combination, low temperature heating elements of low surface area, an outer main protecting case of metal having perforated top and bottom grille plates, a sub-frame within said main protecting case, said sub-frame being made of heat insulating and electrically insulating material, insulating tubes carried by said sub-frame, windings of enamelled copper wire wound on asbestos paper wrapped upon said tubes, said windings constituting the heating members proper, and air passageways between said tubes, the resistance value of the heater relative to its energy consumption and surface area being so chosen that the maximum temperature reached by the copper windings is of the order of 160° F., the inlet air being at about 40° F., and the outlet air discharge being at approximately 120° F.

8. An electric low temperature convector for warming the cooling system and other parts of internal combustion engines comprising in combination, low temperature heating elements of low surface area, an outer main protecting case of metal having perforated top and bottom grille plates, a sub-frame within said main protecting case, said sub-frame being made of heat insulating and electrically insulating material, insulating tubes carried by said sub-frame, windings of enamelled copper wire wound on asbestos paper wrapped upon said tubes, said windings constituting the heating members proper, air passageways between said tubes, the resistance value of the heater relative to its energy consumption and surface area being so chosen that the maximum temperature reached by the copper windings is of the order of 160° F., the inlet air being at about 40° F., the outlet air discharge being at approximately 120° F., and a circuit extending from a source of electrical supply to said convector and thermostatic switch regulator included in said circuit.

In testimony that we claim the foregoing as our invention, we have signed our names this tenth day of December, 1929.

OLIVER LEOPOLD PEARD.
STANLEY McCLOUD PEARD.
ALFRED FRANK HARRISON.